US009158307B2

(12) United States Patent
Saltsman

(10) Patent No.: US 9,158,307 B2
(45) Date of Patent: Oct. 13, 2015

(54) SYSTEM AND METHOD FOR FEED-FORWARD VALVE TEST COMPENSATION

(71) Applicant: General Electric Company, Schenectady, NY (US)

(72) Inventor: Joseph Clay Saltsman, Fonda, NY (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 13/898,005

(22) Filed: May 20, 2013

(65) Prior Publication Data
US 2014/0338762 A1    Nov. 20, 2014

(51) Int. Cl.
| F17D 3/00 | (2006.01) |
| G05D 7/06 | (2006.01) |
| F01D 17/18 | (2006.01) |
| F01D 21/00 | (2006.01) |

(52) U.S. Cl.
CPC .............. *G05D 7/0623* (2013.01); *F01D 17/18* (2013.01); *F01D 21/003* (2013.01); *F05D 2220/31* (2013.01); *Y10T 137/7761* (2015.04)

(58) Field of Classification Search
CPC ..... G05D 7/0623; F01D 17/18; F01D 21/003; Y10T 137/7761; F05D 2220/31
USPC .............. 137/487.5, 599.07, 599.06, 599.01, 137/599.05; 60/660; 73/168; 700/282
See application file for complete search history.

(56) References Cited

U.S. PATENT DOCUMENTS

| 3,552,872 | A | * | 1/1971 | Giras et al. ...................... 415/17 |
| 4,002,065 | A |   | 1/1977 | Lardi et al. |
| 4,019,390 | A | * | 4/1977 | Smith et al. .................. 73/865.9 |
| 4,177,387 | A | * | 12/1979 | Malone ........................ 290/40 R |
| 4,245,162 | A |   | 1/1981 | Ronnen et al. |
| 4,512,185 | A |   | 4/1985 | Ghrist, III |
| 4,656,827 | A | * | 4/1987 | Puillet ........................ 60/39.281 |
| 4,811,565 | A | * | 3/1989 | Hwang ........................... 60/646 |
| 7,134,834 | B2 | * | 11/2006 | Molitor ............................. 415/1 |
| 8,015,791 | B2 | * | 9/2011 | Finkbeiner ................. 60/39.281 |

FOREIGN PATENT DOCUMENTS

JP        0849505 A    2/1996

OTHER PUBLICATIONS

PCT Search Report & Written Opinion issued in connection with corresponding Application No. PCT/US2014/034059 on Jun. 25, 2014.

* cited by examiner

*Primary Examiner* — Craig Schneider
*Assistant Examiner* — Jessica Cahill
(74) *Attorney, Agent, or Firm* — Fletcher Yoder, P.C.

(57) ABSTRACT

A system includes a controller including a processor configured to execute a program stored in a memory of the controller to generate and transmit a first output comprising a total flow demand value to a plurality of valves communicatively coupled to the controller. Each of the plurality of valves is configured to receive a respective portion of the total flow demand value. The processor is configured to receive an input indicative of a decoupling of a first valve of the plurality of valves and to generate a second output based at least in part on the first output and a first operational characteristic of the first valve. The second output is configured to vary a second operational characteristic of a second valve of the plurality of valves to maintain the total flow demand value.

20 Claims, 5 Drawing Sheets

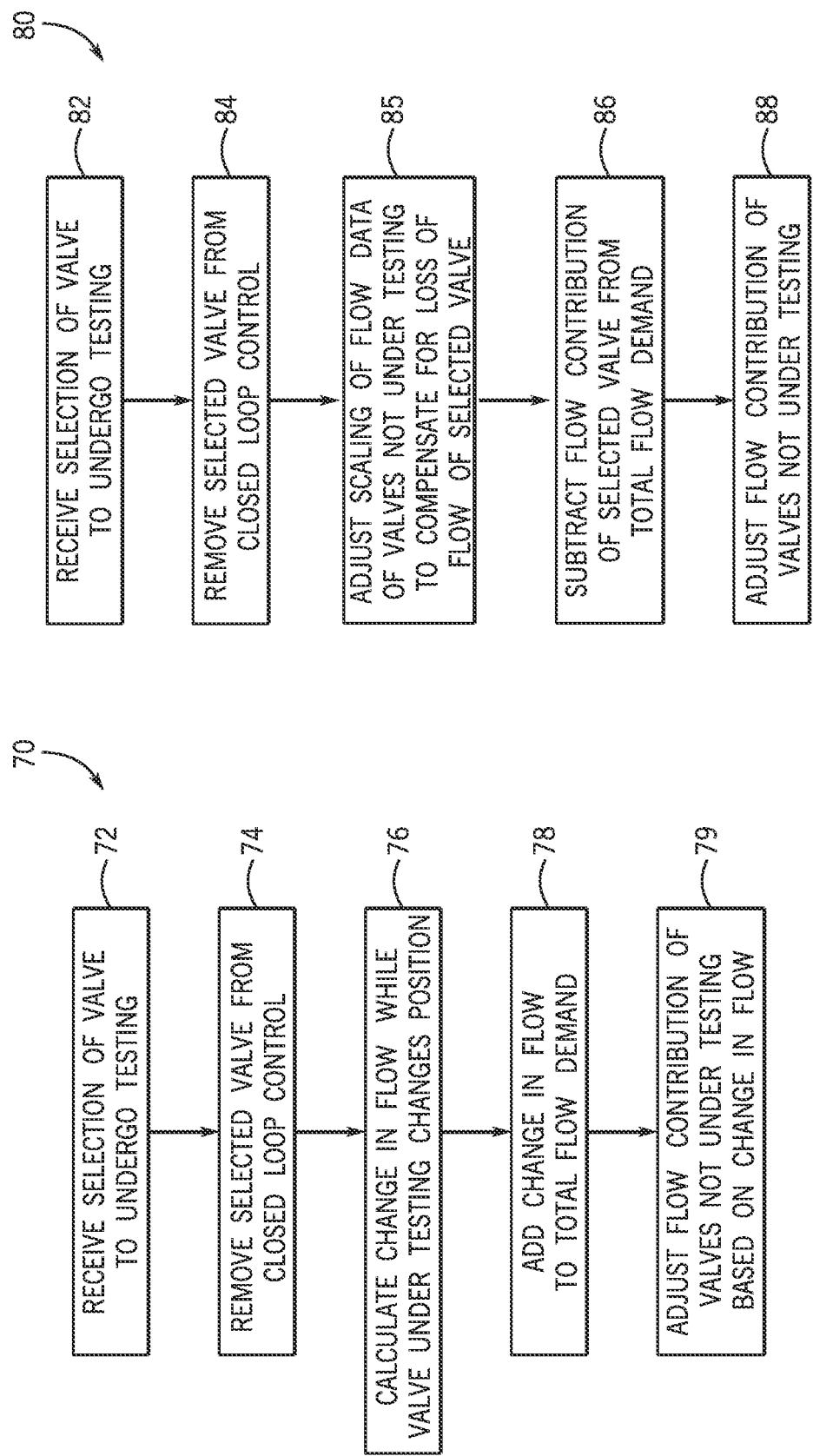

SYSTEM AND METHOD FOR FEED-FORWARD VALVE TEST COMPENSATION

BACKGROUND

The subject matter disclosed herein relates to steam turbine systems and, more specifically, to valve test compensation for the steam turbine systems.

Certain steam turbine systems and associated components may periodically be subject to or undergo certain testing. For example, operational testing may be serially performed on inlet flow control valves used in steam turbine systems. However, operational parameters, such as the pressure of the steam turbine, may be increased when online valve testing is performed due to frequent closing, opening, and/or reopening of the turbine valves under test. Furthermore, certain control schemes for the control valves may be hindered based on the configuration of the valve and turbine arrangement. It is desirable to provide methods to improve online valve testing in steam turbine systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a controller including a processor configured to execute a program stored in a memory of the controller to generate and transmit a first output including a total flow demand value to a plurality of valves communicatively coupled to the controller. Each of the plurality of valves is configured to receive a respective portion of the total flow demand value. The processor is configured to receive an input indicative of a decoupling of a first valve of the plurality of valves, and to generate a second output based at least in part on the first output and a first operational characteristic of the first valve. The second output is configured to vary a second operational characteristic of a second valve of the plurality of valves to maintain the total flow demand value.

In accordance with a second embodiment, a non-transitory computer-readable medium having code stored thereon, the code includes instructions to generate and transmit a first output including a total flow demand value to a plurality of valves. Each of the plurality of valves is configured to receive a respective portion of the total flow demand value. The code includes instructions to receive an input indicative of a decoupling of a first valve of the plurality of valves, and to generate a second output based at least in part on the first output and a first operational characteristic of the first valve. The second output is configured to vary a second operational characteristic of a second valve of the plurality of valves to maintain the total flow demand value.

In accordance with a third embodiment, a system includes a controller configured to control one or more operational parameters of a turbine system, and configured to generate and transmit a first output including a total flow demand value to a plurality of valves communicatively coupled to the controller. Each of the plurality of valves is configured to receive a respective portion of the total flow demand value to regulate a flow of fluid to the turbine system including the plurality of valves. The controller is configured to receive an input indicative of a decoupling of a first valve of the plurality of valves, and to generate a second output based at least in part on the first output and a first operational characteristic of the first valve. The second output is configured to vary a second operational characteristic of a second valve of the plurality of valves to maintain the total flow demand value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a flow chart of an embodiment of a process suitable for implementing feed-forward valve flow compensation control of the valves of FIG. 1, in accordance with present embodiments; and FIG. 6 is a flow chart of an alternative process suitable for implementing feed-forward valve flow compensation control of the valves of FIG. 1, in accordance with present embodiments.

DETAILED DESCRIPTION

Figure 1:
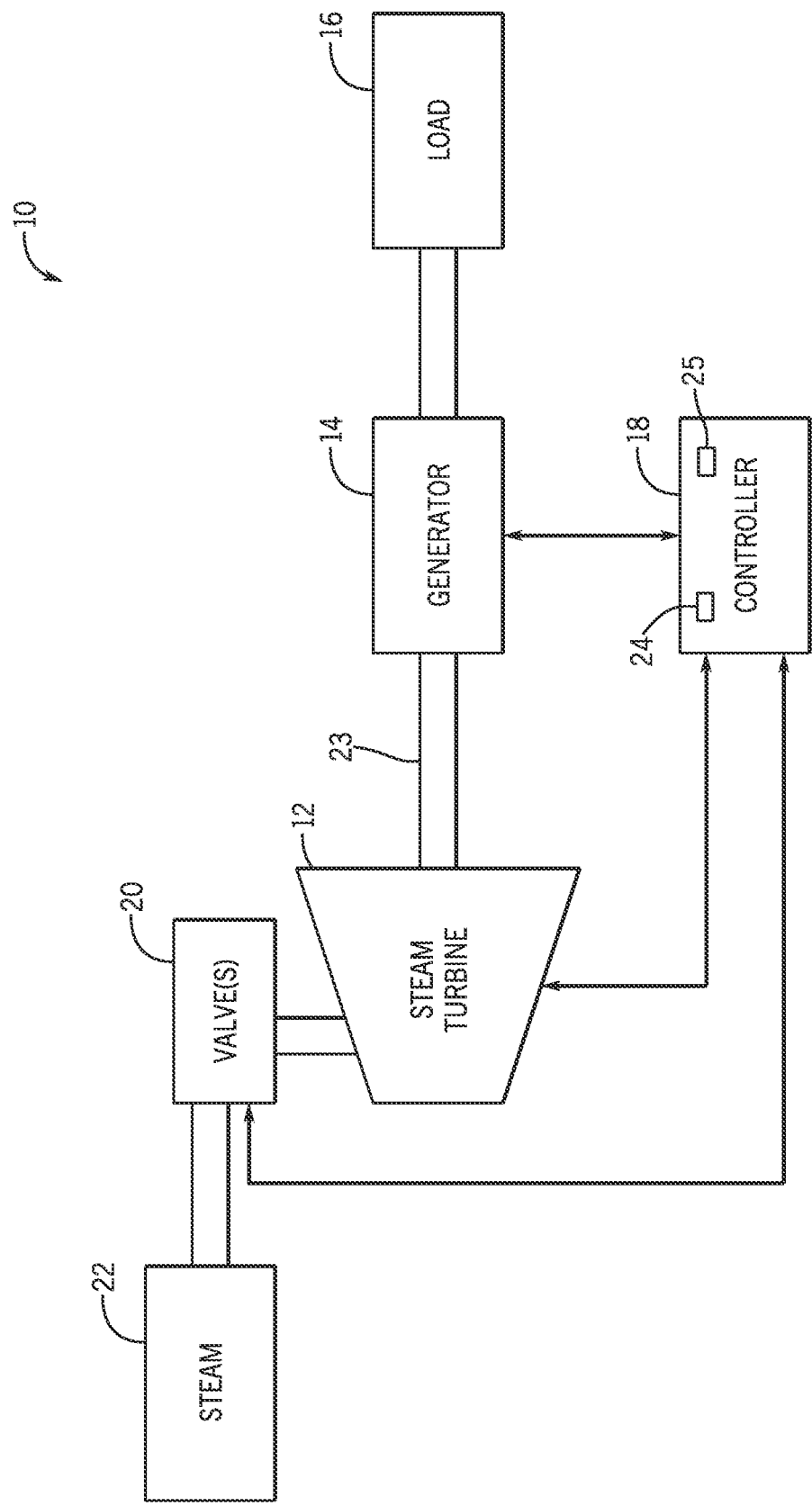
FIG. 1 is a block diagram of an embodiment of a turbine-generator system including a number of valves, in accordance with present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to utilizing feed-forward valve flow compensation techniques to control fluid flow to a turbine configured according to one or more of a full arc admission (e.g., in which valve actuation may be concurrent and/or synchronized to allow equal flow of fluid through each of the individual valves to the turbine) or a partial arc admission (e.g., in which valve actuation may be substantially independent and/or unsynchronized to independently regulate the flow of fluid through each of the individual valves to the turbine). In certain embodiments, a controller may use valve stroke and/or valve stem position information as feedback into a flow compensation control loop to maintain a total flow demand (e.g., the total amount of fluid movement and/or flow required by the turbine to perform one or more various operations) of the turbine during operational testing (e.g., testing by opening, closing, and/or reopening of a valve) of at least one valve of a number of valves coupled to the turbine.

Specifically, an operator, for example, may select a valve to undergo operational testing. Once selected, the controller may determine to remove the valve undergoing testing from closed-loop control and/or automatic control, and place the valve undergoing testing under open-loop and/or manual control. The remaining valves may then be re-calibrated to control the remainder of the total flow demand due to the loss of flow demand contribution of the valve undergoing testing, so as to minimize flow disturbance to the turbine that may be due to the closing, opening, and/or reopening of the valve undergoing testing. In one embodiment, a difference between the pre-testing flow demand contribution of the valve undergoing testing may be added to the total flow demand. In another embodiment, the flow demand contribution of the valve undergoing testing may be directly subtracted from the total flow demand. In either case, the controller may determine a new valve stroke and/or valve stem position for each of the remaining valves under closed-loop control (e.g., valves not currently undergoing testing) to maintain the total flow demand of the turbine. Indeed, the present embodiments may allow for feed-forward flow compensation for valve and turbine partial arc admission configurations, as well as full arc admission configurations.

With the foregoing in mind, it may be useful to describe a turbine-generator system, such as an example turbine-generator system 10 illustrated in FIG. 1. As depicted, the system 10 may include a steam turbine 12 (or gas turbine 12), a generator 14 coupled to a load 16, and a controller 18. The steam turbine 12 may be further coupled to one or more valves 20, which may control the steam intake 22 to the steam turbine 12. The steam turbine 12 may use the steam intake 22 to deliver an output (e.g., mechanical power output) via a shaft 23 to the generator 14.

In certain embodiments, the valves 20 may include a number of parallel valves (e.g., 2, 3, 4, or more valves), and may regulate the steam intake 22 of the steam turbine 12 according to a full arc admission, partial arc admission, or other similar fluid admission technique. For example, using full arc admission, the one or more valves 20 may be actuated and/or positioned (e.g., controlled by the controller 18) concurrently, allowing equal steam intake 22 to the steam turbine 12. In a similar example, using partial arc admission, the valves 20 may regulate the steam intake 22 of the steam turbine 12 by, for example, a subset (e.g., 3 out of 4 valves, or other similar arrangement) of the valves 20 being actuated and/or positioned (e.g., controlled by the controller 18) concurrently, while the remaining valve(s) 20 of the set may be actuated and/or positioned after a period of time. Thus, using partial arc admission, the steam intake 22 to the steam turbine 12 may be regulated separately and/or independently with respect to the different valves 20.

As previously noted, the system 10 may also include the controller 18. The controller 18 may be suitable for generating and implementing various control algorithms and techniques to control the valves 20, and by extension the steam intake 22 to the steam turbine 12. The controller 18 may also provide an operator interface through which an engineer or technician may monitor the components of the turbine-generator system 10 such as, components (e.g., sensors) of the steam turbine system 12 and the generator 14. Accordingly, the controller 18 may include a processor 24 that may be used in processing readable and executable computer instructions, and a memory 25 that may be used to store the readable and executable computer instructions and other data. These instructions may be encoded in programs stored in tangible non-transitory computer-readable medium such as the memory 25 and/or other storage of the controller 18. Furthermore, the processor 24 and the memory 25 may allow the controller 18 to be programmably retrofitted with the instructions to carry out the presently disclosed techniques without the need to include, for example, additional hardware components. In certain embodiments, the controller 18 may also host various industrial control software, such as a human-machine interface (HMI) software, a manufacturing execution system (MES), a distributed control system (DCS), and/or a supervisor control and data acquisition (SCADA) system. The controller 18 may further support one or more industrial communications (e.g., wired or wireless) protocols. For example, the controller 18 may support GE ControlST™ available from General Electric Co., of Schenectady, N.Y.

Figure 2:
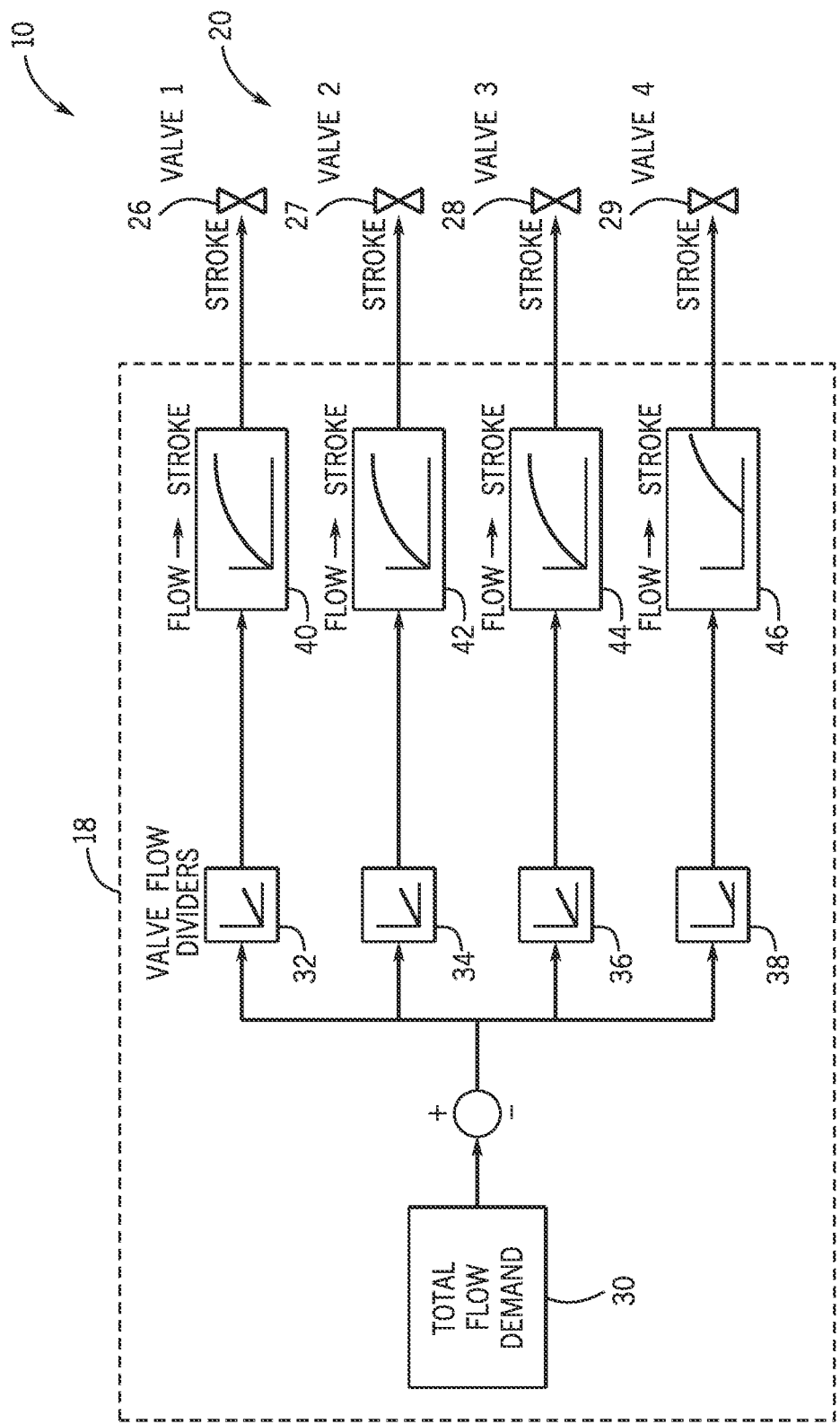
FIG. 2 is a block diagram of an embodiment of a controller to control the valves included within the system of FIG. 1, in accordance with present embodiments.

Turning now to FIG. 2, a block diagram of an embodiment of the controller 18 is illustrated. As depicted, the controller 18 may be useful in controlling one or more valves 20, or a series of four valves 26 (e.g., Valve 1), 27 (e.g., Valve 2), 28 (e.g., Valve 3), and 29 (e.g., Valve 4). Indeed, the controller 18 may utilize feed-forward control to control valve position as feedback to reduce flow disturbance caused by the operation (e.g., closing, opening, and/or reopening) of the valves 26, 27, 28, and 29 during periodic operational testing. For example, as illustrated in FIG. 2, a total flow demand input 30 for all of the valves 26, 27, 28, and 29 may be generated as a function of control valve position (e.g., position or stroke of the stem of the valves 26, 27, 28, and 29). Specifically, the total flow demand input 30 may represent the mass flow being demanded (e.g., the amount of steam intake 22 that may be required by the steam turbine 12 to perform more efficiently) as a percentage value. The total flow demand input 30 may be divided (e.g., equally divided and/or unequally divided) via flow dividers 32, 34, 36, and 38, and input into respective valve flow-stroke converters 40, 42, 44, and 46 for each of the respective valves 26, 27, 28, and 29.

In certain embodiments, the valve flow-stroke converters 40, 42, 44, and 46, as illustrated by respective flow-stroke curves, may represent the different flow characteristics between the valves 26, 27, 28, and 29. For example, the horizontal axis of the flow-stroke curves of the flow-stroke converters 40, 42, 44, and 46 may represent valve stroke (e.g., valve stem positioning) in inches. Similarly, the vertical axis may represent flow in pounds mass per hour (lbm/hr). Indeed, the flow-stroke converters 40, 42, 44, and 46 may each include one or more data arrays (e.g., two-dimensional look up table) that may map, for example, an individual flow demand value (e.g., percentage or portion of the total flow demand input 30) to corresponding stroke or valve stem position for each of the individual valves 26, 27, 28, and 29 (e.g., as illustrated by the respective flow-stroke curves of the flow-stroke converters 40, 42, 44, and 46). As previously noted, in certain embodiments, the controller 18 may generate a signal to actuate one or more of the valves the valves 26, 27, 28, and 29 such that the steam intake 22, for example, is admitted to the steam turbine 12 according to partial arc admission. For example, as further illustrated in FIG. 2, the stroke (e.g., as shown via the flow-stroke converters 40, 42, and 44,) of the valves 26, 27, and 28 may be generated substantially at the same time, while the stroke (e.g., as shown via the flow-stroke converter 46) of the valve 29 may be changed at a point time afterwards. As will be further appreciated, because of the partial arc admission configuration, the controller 18 may be hindered in dividing the total flow demand input 30 evenly amongst the valves 26, 27, 28, and 29.

Figure 3:
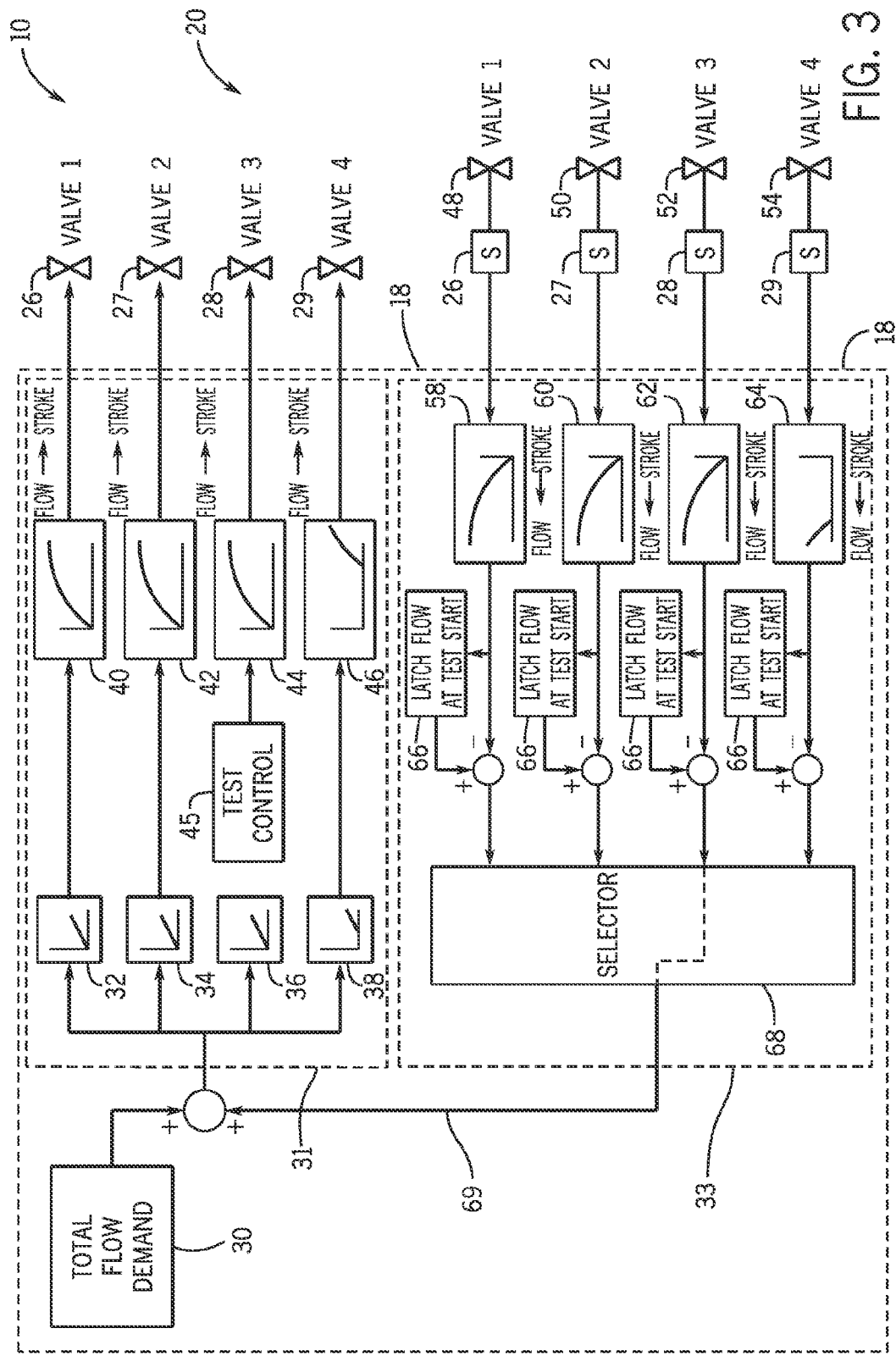
FIG. 3 is a block diagram of one embodiment of a feed-forward valve flow compensation controller as the controller of FIG. 2, in accordance with present embodiments.

FIG. 3 is a block diagram illustrating an embodiment of the controller 18, in which the mass flow through each of the valves 26, 27, 28, and 29 in a partial arc configuration is controlled during an operational testing of at least one of the valves 26, 27, 28, and 29. As depicted, during a valve operational test of valve 28, for example, the valve 28 may be removed from control loop 31 (e.g., closed-loop control), and placed under open-loop and/or manual control via test control input 45. As noted above with respect to FIG. 2, the total flow demand input 30 (e.g. 70, 80, 90% of the maximum flow rating of the steam turbine 12) may be shared (e.g., an approximate percentage of the total flow demand) across the valves 26, 27, 28, and 29. However, when one of the valves 26, 27, 28, and 29 (e.g., valve 28) is selected (e.g., by an operator) to undergo operational testing, the input flow demand based on the total flow demand input 30 may be readjusted to compensate for the loss of flow due to the testing of the valve 28. Specifically, in one embodiment, a change in the flow of the tested valve (e.g., valve 28) during testing may be calculated and added to the total flow demand input 30. In another embodiment, the flow of the tested valve (e.g., valve 28) may be subtracted from the total flow demand input 30. In either embodiment, a new stroke command may be generated for each of the valves (e.g., valves 26, 27, and 29) not undergoing operational testing to maintain, for example, the initial total flow demand of the steam turbine 12.

For example, the controller 18 may also include a flow compensation control loop 33 to control valve stroke and/or valve stem positions by adjusting the flow through the parallel control valves 26, 27, and 29, and thus minimize flow disturbance of the steam turbine 12 that may be caused by the closing, opening, and/or reopening of the valve 28 during operational testing. The controller 18 may receive stroke and/or valve stem position data of the valves 26, 27, 28, and 29 via one or more sensors 56. In certain embodiments, the sensors 56 may include, for example, a linear variable differential transformer (LVDT), a linear variable differential reactor (LVDR), or any device useful in measuring linear position and/or displacement of the stem of the valves 26, 27, 28, and 29. The controller 18 may use the valve stroke and/or valve stem position data collected via the sensors 56 to generate a corresponding flow value via stroke-flow converters 58, 60, 62, and 64 based on the stroke of the valves 26, 27, 28, and 29.

In certain embodiments, the stroke-flow converters 58, 60, 62, and 64 may include inversions of the curves and/or data arrays of the corresponding flow-stroke converters 40, 42, 44, and 46. For example, should the valves 26 and 27 each be controlled and/or clamped to a certain percentage (e.g., 20-25%) of the total flow demand input 30 by way of one or more latches 66 and the valve 29 be controlled and/or clamped to a certain lesser percentage (e.g., 10-15%) via the latches 66, a change in flow may be calculated for each of the valves 26, 27, and 29, as well as the valve 28 undergoing testing. Specifically, a difference between the pre-testing flow contribution (e.g., pre-test percentage of the total flow demand input 30) for each of the valves 26, 27, 28, and 29 pre-testing of the valve 28 and the flow during operational testing derived based on the stroke data received via the sensors 56 may be calculated. In certain embodiments, the difference between the valves 26, 27, and 29 not undergoing testing may be substantially zero, while the difference between the flow contribution for the valve 28 undergoing operational testing and the flow derived based on the stroke data may vary throughout the testing of the valve 28.

The respective difference outputs may be input to a selector 68, which may produce a signal output 69 to add to the pre-testing total flow demand input 30 to control the flow through the valves 26, 27, and 29 (e.g., valves under closed-loop control and/or automatic control during testing of valve 28), and by extension, the mass flow steam intake 22 into the turbine 12. Particularly, the signal output 69 may include the difference between the pre-testing flow demand contribution of the valve 28 (e.g., valve undergoing testing) and the flow demand contribution of the valve 28 during testing, as the flow demand contribution of the valve 28 may vary, for example, between 1%, 5%, 10%, 15%, 20%, or more as the testing of the valve 28 progresses. Accordingly, the signal output 69 may be the flow compensation (e.g., a percentage value) of the valve undergoing testing (e.g., valve 28) that may be added to the total flow demand input 30, such that flow demand contribution of each of the valves 26, 27, and 29 (e.g., valves under closed-loop control and/or automatic control during testing of valve 28) may be adjusted by deriving a new stroke command for each of the valves 26, 27, and 29 based on the sum of the signal output 69 of the selector 68 and the total flow demand input 30. Thus, the controller 18 may compensate for loss of flow contribution by generating a signal to adjust the flow through the valves 26, 27, and 29 not undergoing testing to maintain the total flow demand (e.g., total flow demand input 30) and compensate for any reduced flow capacity of the valve 28 during operational testing. Thus, the potential of a flow disturbance to the steam turbine 12 due to the testing (e.g., closing, opening, and/or reopening) of the valve 28 may be minimized.

Figure 4:
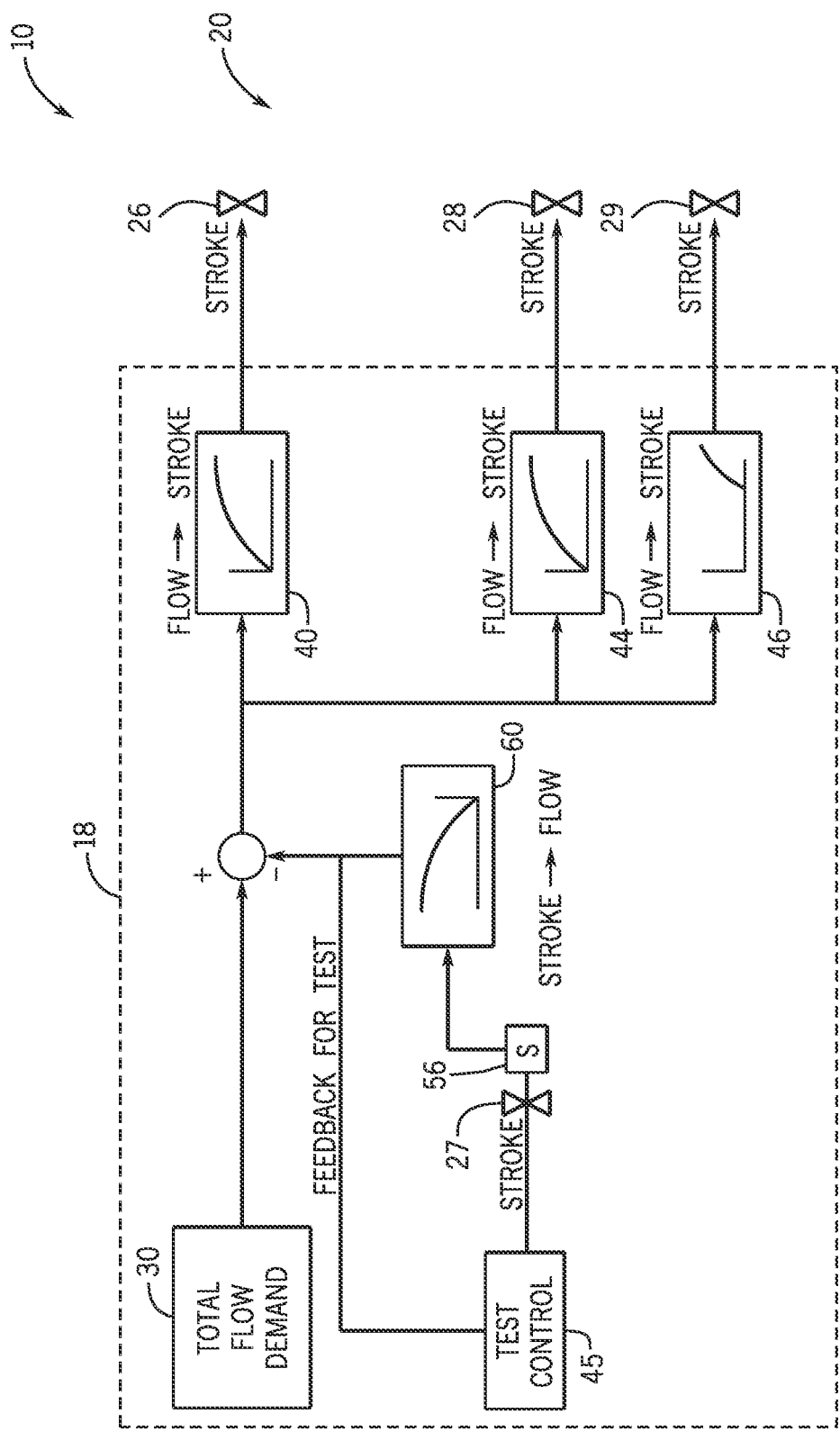
FIG. 4 is a block diagram of another embodiment of the feed-forward valve flow compensation controller as the controller of FIG. 2, in accordance with present embodiments.

FIG. 4 illustrates another embodiment of the controller 18, in which the mass flow through each of the valves 26, 27, 28, and 29 in a partial arc configuration is controlled during an operational testing of at least one of the valves 26, 27, 28, and 29. In the illustrated embodiment, the valve 27 may be selected to undergo testing. However, it should be appreciated that one, two, or more of the valves 26, 27, 28, and 29 may be selected to undergo valve testing in series or in parallel. Similar to that noted above with respect to FIG. 3, the valve (e.g., valve 27) undergoing testing may be removed from closed-loop control, and placed under open-loop and/or manual control via test control input 45. Further, as previously noted, the total flow demand input 30 (e.g. 70, 80, 90%) may be shared (e.g., distributed) across the respective valves 26, 27, 28, and 29. However, in the present embodiment, once the valve 27 is removed from the closed-loop control for operational testing, under test control 45, the controller 18 may use the valve stroke data collected via the sensor 56 to generate a flow command via the stroke-flow converter 60 based on the stroke of the valve 27 (e.g., the valve undergoing operational testing). Specifically, the flow demand contribution (e.g., shared percentage of the total flow demand input 30) of the valve 27 may be subtracted from the total flow demand input 30. Based on this calculated difference, a new stroke command may be generated via the respective flow-stroke converters 40, 44, and 46 for each of the valves 26, 28, and 29 to compensate for the loss flow demand contribution of the valve 27. That is, the flow through parallel valves 26, 28, and 29 may be adjusted to maintain the total flow demand (e.g., total flow demand input 30), for example, and thus minimize flow disturbance of the steam turbine 12.

Turning now to FIG. 5, a flow diagram is presented, illustrating an embodiment of a process 70 useful in controlling the mass flow through each of a number of valves in a partial arc configuration during operational testing, by using, for example, the controller 18 included in the system 10 depicted in FIG. 1. The process 70 may include code or instructions stored in a non-transitory machine-readable medium (e.g., the memory 25) and executed, for example, by one or more processors (e.g., processor 24) included in the controller 18. The process 70 may begin with the controller 18 receiving (block 72) an indication corresponding to a selection of a valve to undergo operational testing. For example, one or more of the valves 26, 27, 28, and 29 may be selected to undergo operational testing while in operation and coupled to the turbine 12. The process 70 may continue with the controller 18 determining to remove (block 74) the selected valve from closed-loop control (e.g., automatic control) to undergo operational (e.g., closing, opening, and/or reopening) testing. Specifically, the valve undergoing testing may be placed under manual and/or open-loop control.

The process 70 may then continue with the controller 18 calculating (block 76) the change in flow (e.g., a change in the flow contribution of the valve undergoing testing) while the valve (e.g. valve 28 as illustrated in FIG. 3) undergoing testing changes stroke and/or valve stem position. Specifically, a difference between the pre-testing flow contribution for each of the valves 26, 27, 28, and 29 and the flow derived based on the stroke data received via the sensors 56 may be calculated. The process 70 may then continue with the controller 18 adding (block 78) the change in flow (e.g., percentage value) to the total flow demand (e.g., percentage value of the flow demand for all of the valves 26, 27, 28, and 29 to collectively deliver to the steam turbine 12). The process 70 may then conclude with the controller 18 generating a control signal to adjust (block 79) the flow demand contribution of each of the valves 26, 27, and 29 not undergoing testing by deriving a new stroke command for each of the valves 26, 27, and 29 based on the sum of the change in individual flow demand contribution and the total flow demand.

Similarly, FIG. 6 depicts a flow diagram, illustrating embodiment of a process 80 useful in controlling the mass flow through each of a number of valves in a partial arc configuration during operational testing, by using, for example, the controller 18 included in the system 10 depicted in FIG. 1. In certain embodiments, the process 80 may be implemented as an alternative to the process 70. Similar to the process 70, the process 80 may include code or instructions stored in a non-transitory machine-readable medium (e.g., the memory 25) and executed, for example, by one or more processors (e.g., processor 24) included in the controller 18. The process 80 may begin with the controller 18 receiving (block 82) an indication corresponding to a selection of a valve to undergo operational testing. As noted above, one or more of the valves 26, 27, 28, and 29 may be selected to undergo operational testing while in operation and while coupled to the turbine 12.

The process 80 may continue with the controller 18 determining to remove (block 84) the selected valve from closed-loop control (e.g., automatic control) to undergo operational (e.g., closing, opening, and/or reopening) testing. The process 80 may continue with the controller 18 adjusting (block 85) the scaling of flow data (e.g., via the flow-stroke converters 40, 44, and 46 as illustrated in FIG. 4) of the valves (e.g. valves 26, 28, and 29) not undergoing testing to compensate for the loss of flow of the valve undergoing testing (e.g. valve 27 as illustrated in FIG. 4). Specifically, to compensate for the loss of flow of the valve (e.g. valve 27) undergoing testing, the flow data may be scaled via the flow-stroke converters 40, 44, and 46 such that the reduced flow value may yield the same stroke positions as before for the valves (e.g. valves 26, 28, and 29) not undergoing testing.

The process 80 may then continue with the controller 18 subtracting (block 86) the flow demand contribution of the valve (e.g. valve 27 as illustrated in FIG. 4) undergoing testing from the total flow demand (e.g., percentage value of the flow demand for all of the valves 26, 27, 28, and 29). Indeed, as the valve (e.g., valve 27) undergoing testing is closed (e.g., as part of the testing), the subtracted flow demand contribution of the valve undergoing testing may decrease while the total flow demand increases. Similarly, as the valve (e.g., valve 27) undergoing testing is opened (e.g., as part of the testing), the subtracted flow demand contribution of the valve undergoing testing may increase while the total flow demand decreases. Thus, the process 80 may conclude with the controller 18 generating a control signal to adjust (block 88) the flow demand contribution of each of the valves 26, 27, and 29 not undergoing testing by deriving new stroke commands to transmit to each of the respective valves 26, 27, and 29 based on the difference between the flow demand contribution of the valve (e.g., valve 27) undergoing testing and the total flow demand for each of the valves 26, 27, 28, and 29 to collectively deliver to the turbine 12.

Technical effects of the present embodiments include utilizing feed-forward valve flow compensation techniques to control fluid flow to a turbine configured according to one or more of a partial arc admission or a full arc admission. In certain embodiments, a controller may use control valve stroke and/or valve stem position information as feedback into a flow compensation control loop to maintain a total flow demand of the turbine during an operational testing (e.g., testing by opening, closing, and/or reopening of a valve) of at least one valve of a number of valves coupled to the turbine. Specifically, an operator, for example, may select a valve to undergo operational testing. Once selected, the controller may determine to remove the valve undergoing testing from closed-loop control and/or automatic control, and place the valve under open-loop and/or manual control. The remaining valves may then be re-calibrated to control the remainder of the total flow demand due to the loss of flow demand contribution of the valve undergoing testing. In one embodiment, a difference between the pre-testing flow demand contribution of the valve undergoing testing may be added to the total flow demand. In another embodiment, flow demand contribution of the valve undergoing testing may be directly subtracted from the total flow demand. In either case, the controller may determine a new valve stroke and/or valve stem position for each of the remaining valves under closed-loop control (e.g., valves not currently undergoing testing) to maintain the total flow demand of the turbine. Indeed, the present embodiments may allow for feed-forward flow compensation for valve and turbine partial arc admission configurations, as well as full arc admission configurations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a controller comprising a processor configured to execute a program stored in a memory of the controller to:

generate and transmit a first output comprising a total flow demand value to a plurality of valves communicatively coupled to the controller, wherein each of the plurality of valves is configured to receive a respective portion of the total flow demand value;

receive an input indicative of a decoupling of a first valve of the plurality of valves; and generate a second output based at least in part on the first output and a first operational characteristic of the first valve, wherein the second output is configured to vary a second operational characteristic of a second valve of the plurality of valves to maintain the total flow demand value;

derive a third operational characteristic value based at least in part on the first operational characteristic of the first valve; and modify the third operational characteristic value based at least in part on the total flow demand value.

2. The system of claim 1, wherein the processor is configured to:

receive an input indicative of a measure of the first operational characteristic of the first valve; and determine a third operational characteristic of the first valve based at least in part on the measure of the first operational characteristic of the first valve.

3. The system of claim 1, wherein the processor is configured to generate the second output by deriving a third operational characteristic value comprising a flow of the first valve based at least in part on the first operational characteristic comprising a stroke of the first valve.

4. The system of claim 1, wherein the processor is configured to receive an indication of a selection of the first valve to undergo operational testing as the decoupling of the first valve.

5. The system of claim 1, wherein the processor is configured to modify the third operational characteristic value by adding a difference between the third operational characteristic value and the respective portion of the total flow demand value received by the first valve to the total flow demand value.

6. The system of claim 1, wherein the processor is configured to modify the third operational characteristic value by subtracting the third operational characteristic value from the total flow demand value.

7. The system of claim 1, wherein the controller is configured to be programmably retrofitted with instructions to generate the second output and to vary the second operational characteristic of the second valve to maintain the total flow demand value.

8. The system of claim 1, wherein the plurality of valves is configured to regulate a flow of fluid to a turbine in parallel.

9. The system of claim 8, wherein the processor is configured to generate and transmit the first output to actuate each of the plurality of valves to regulate the flow of fluid according to a partial arc admission technique, in which the processor is configured to actuate each of the plurality of valves substantially independently.

10. The system of claim 8, wherein the processor is configured to generate and transmit the first output to actuate the plurality of valves to regulate the flow of fluid according to a full arc admission technique, in which the processor is configured to actuate each of the plurality of valves substantially concurrently.

11. A non-transitory computer-readable medium having computer executable code stored thereon, the code comprising instructions to:

generate and transmit a first output comprising a total flow demand value to a plurality of valves, wherein each of the plurality of valves is configured to receive a respective portion of the total flow demand value;

receive an input indicative of a decoupling of a first valve of the plurality of valves; and generate a second output based at least in part on the first output and a first operational characteristic of the first valve, wherein the second output is configured to vary a second operational characteristic of a second valve of the plurality of valves to maintain the total flow demand value;

derive a third operational characteristic value based at least in part on the first operational characteristic of the first valve; and modify the third operational characteristic value based at least in part on the total flow demand value.

12. The non-transitory computer-readable medium of claim 11, wherein the code comprises instructions to generate and transmit the first output to actuate each of the plurality of valves substantially independently.

13. The non-transitory computer-readable medium of claim 11, wherein the code comprises instructions to generate and transmit the first output to actuate each of the plurality of valves substantially concurrently.

14. The non-transitory computer-readable medium of claim 11, wherein the code comprises instructions to generate the second output by deriving a third operational characteristic value comprising a flow of the first valve based at least in part on the first operational characteristic comprising a stroke of the first valve.

15. The non-transitory computer-readable medium of claim 11, wherein the code comprises instructions to add a difference between the third operational characteristic value and the respective portion of the total flow demand value received by the first valve to the total flow demand value.

16. The non-transitory computer-readable medium of claim 11, wherein the code comprises instructions to subtract the third operational characteristic value from the total flow demand value.

17. A system, comprising:

a controller configured to control one or more operational parameters of a turbine system, and configured to:

generate and transmit a first output comprising a total flow demand value to a plurality of valves communicatively coupled to the controller, wherein each of the plurality of valves is configured to receive a respective portion of the total flow demand value to regulate a flow of fluid to the turbine system comprising the plurality of valves;

receive an input indicative of a decoupling of a first valve of the plurality of valves; and generate a second output based at least in part on the first output and a first operational characteristic of the first valve, wherein the second output is configured to vary a second operational characteristic of a second valve of the plurality of valves to maintain the total flow demand value;

derive a third operational characteristic value based at least in part on the first operational characteristic of the first valve; and modify the third operational characteristic value based at least in part on the total flow demand value.

18. The system of claim 17, wherein the turbine system comprises a steam turbine system, a gas turbine system, or a combination thereof, and wherein the plurality of valves is configured to regulate the flow of fluid according to a partial arc admission, in which each of the plurality of valves is configured to independently regulate the flow of fluid.

19. The system of claim 17, wherein the controller is configured to generate the second output by:
  deriving a third operational characteristic value based on the first operational characteristic of the first valve, wherein the third operation characteristic comprises a flow of the first valve; and
  adding a difference between the third operational characteristic value of the first valve and the respective portion of the total flow demand value received by the first valve to the total flow demand value, wherein the first valve comprises a valve undergoing operational testing and the second valve comprises a valve not undergoing operational testing.

20. The system of claim 17, wherein the controller is configured to modify the operational characteristic value by subtracting the third operational characteristic value from the total flow demand value.

\* \* \* \* \*